Oct. 27, 1964  D. W. PERKINS  3,154,749
MODULATOR ENVELOPE DETECTOR
Filed April 6, 1962  2 Sheets-Sheet 1
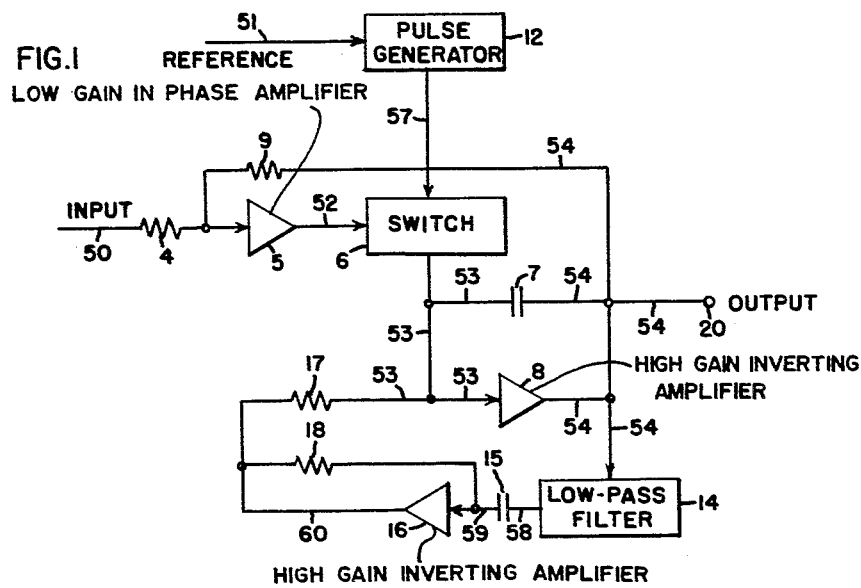
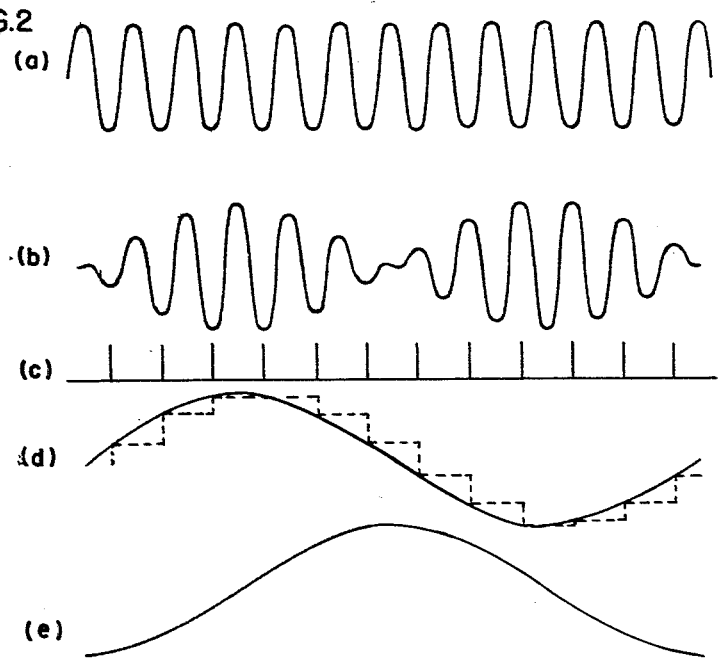
INVENTOR:
DONALD W. PERKINS,
BY Delbert P. Warner
HIS ATTORNEY.

United States Patent Office 3,154,749
Patented Oct. 27, 1964

3,154,749
MODULATOR ENVELOPE DETECTOR
Donald W. Perkins, De Witt, N.Y., assignor to General
Electric Company, a corporation of New York
Filed Apr. 6, 1962, Ser. No. 185,698
7 Claims. (Cl. 329—169)

This invention relates to a detector and, in particular, to a detector for deriving the modulation envelope of a signal carrier in a sampled data system.

It is frequently desirable in a control system to utilize sampled data as the input or actuating signal in the system. A sampled data signal is distinguished from a continuous data signal in that the former comprises a series of spaced, discrete pulses with the information carried on the amplitude or phase of the pulses. A sampled data signal is ordinarily derived from a continuous signal as described in Truxal, "Automatic Feedback Control System Synthesis," New York, McGraw-Hill, 1955, chapter 9. Utilization of sampled data to effect the control function may be necessitated, for example, by the low power output of a sensing element in an instrumentation system. The load on the sensing element is minimized by periodically sampling the output thereof, thereby enabling the sensing element to control large amounts of power. Sampled data control systems are also advantageously used in conjunction with digital computers, radar tracking systems and telemetry systems. Having derived the sampled data signal and transmitted it to the control system, the problem of providing a continuous, accurate reproduction of the original data is presented.

It is an object of the invention to provide an improved detector for deriving the modulation envelope of a sampled data signal.

It is another object of the invention to provide an improved detector for accurately predicting the modulation envelope between sampling periods in a sampled data system.

It is another object of the invention to provide an improved envelope detector for a sampled data signal which incorporates a differentiator and an integrator to more accurately derive the modulation envelope.

Briefly stated, in accordance with the invention, the modulation envelope of the carrier in a sampled data system is derived by periodically applying the sampled signals, in the form of amplitude or phase modulated pulses, to a storage capacitor. A feedback loop, comprising the serial combination of a low-pass filter, a differentiating circuit, and a resistor, is connected between the storage capacitor terminals. A high-gain inverting amplifier is also connected between the capacitor terminals, the storage capacitor, resistor, and high-gain amplifier comprising an integrating circuit. The low-pass filter blocks signals of carrier frequency and passes signals of modulation frequency to the differentiating circuit which provides a differentiated signal indicative of the rate of change of the stored signal. The differentiated signal is applied to the integrator circuit which modifies the signal stored on the capacitor in accordance with the integral of its rate of change, thus accurately predicting the modulation envelope between sampling periods.

The subject matter of the invention is particularly pointed out and distinctly claimed in the concluding portion of the specification. The invention, however, both as to organization and method of operation, may best be understood by reference to the following description taken in connection with the accompanying drawing, in which:

FIG. 1 is a combined block and schematic diagram of the modulation envelope detector of the invention;

FIG. 2 illustrates the wave forms of selected signals in the circuit of FIG. 1.

Figure 3:
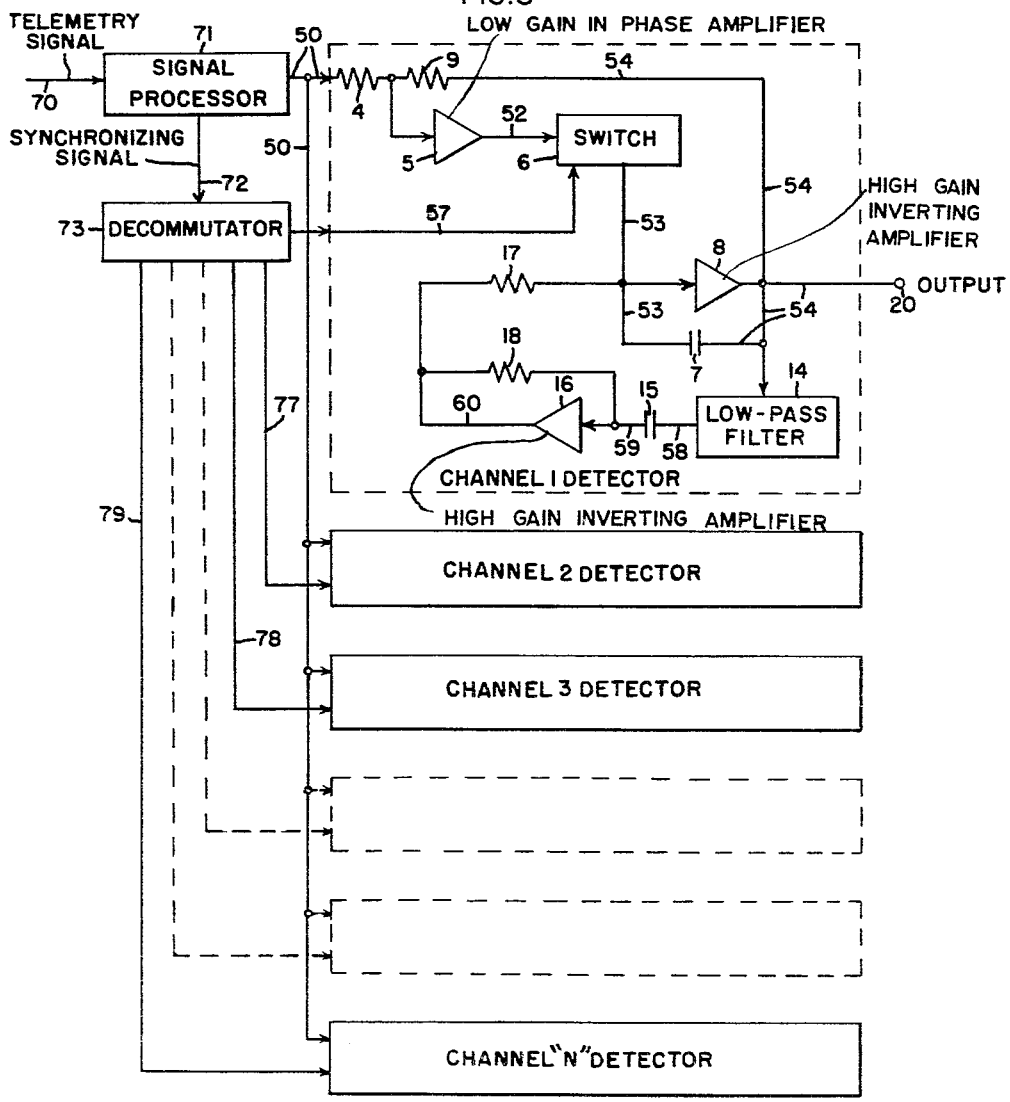
FIG. 3 is a diagram showing the application of the circuit of FIG. 1 to a multi-channel telemetry system.

With reference to FIG. 1, the input signal whose modulation envelope is to be detected is applied to the detector over line 50 while a reference signal is applied to the detector over line 51. The modulated signal on line 50 is applied to resistor 4 and serves as the input signal to amplifier 5 which is a non-inverting, direct coupled amplifier having a high input impedance and a low output impedance. Amplifier 5 may be, for example, a cathode follower amplifier. The output of amplifier 5 is applied over line 52 to switch 6. Switch 6 is preferably of the electronic type, e.g., a transistor switch as known in the art, and is actuated by a control circuit to be described subsequently.

When switch 6 is actuated, the signal on line 52 is applied over switch output line 53 to storage capacitor 7 and amplifier 8. Amplifier 8 is a high-gain, direct coupled, inverting amplifier of the operational type, as known in the art. The output of amplifier 8 is applied to line 54, one branch of which serves as a feedback circuit applying the output of amplifier 8 to the input of amplifier 5 through resistor 9. The output of amplifier 8 and a terminal of storage capacitor 7 are also interconnected by line 54, as shown.

The reference signal on line 51 is applied to pulse generating circuit 12 and controls the circuit 12 in the production of pulses which are applied to switch 6 over line 57. The pulses applied to switch 6 serve to actuate the switch and apply the signal on line 52 to line 53. The pulse generator circuit 12 may comprise a 90° phase shift network in combination with a blocking oscillator, as known in the art. The operation of the pulse generating circuit 12 will be described subsequently.

A feedback circuit comprising low-pass filter 14, capacitor 15, amplifier 16 and resistor 17 is connected across the storage capacitor 7 and the amplifier 8. Resistor 18 is connected across amplifier 16. The signal stored on capacitor 7 is applied to low-pass filter 14 over line 54. Low-pass filter 14 is chosen to have negligible attenuation and phase-shift at the highest modulation frequency and to have high attenuation at the input signal carrier frequency. The filtered signal is applied over line 58 to a terminal of capacitor 15, the other terminal of which is connected to amplifier 16 by line 59. Amplifier 16 is a conventional, high-gain, direct coupled, inverting amplifier of the operational type. The output of amplifier 16 is applied to a terminal of resistor 17 over line 60, the other terminal of resistor 17 being connected to amplifier 8 and storage capacitor 7 over line 53.

The combination of capacitor 15, amplifier 16, and resistor 18 comprises a differentiating circuit while the combination of resistor 17, amplifier 8 and capacitor 7 comprises an integrating circuit. The signal representative of the detected modulation envelope is available at terminal 20 connected to the storage capacitor 7 by line 54.

In the embodiment shown, the frequency of the modulated input signal on line 50 and reference signal on line 51 are identical. The frequency of the reference signal controls the sampling rate of the input signal and the reference frequency may, for example, be a sub-multiple of the input signal carrier frequency, if a lower sampling rate is acceptable or desirable. The frequencies utilized in the system of the invention may extend from the sub-audio frequencies and are limited only by the characteristics of the system components. FIG. 2(a) illustrates the reference signal which may be a simple sinusoid of carrier frequency. FIG. 2(b) represents the modulated carrier signal which is a sinusoidal carrier modulated in amplitude by the signal of interest and reversed in phase relative to the reference signal, in response to a change in polarity of the modulating signal.

In operation, the reference signal of FIG. 2(a) is applied to pulse generator 12 over line 51. The pulse generator, which is synchronized by the reference signal, produces pulses, shown in FIG. 2(c), which coincide with the peaks of the modulated input signal shown in FIG. 2(b). Due to the fact that the input signal carrier experiences a 180° phase-shift when the modulating signal changes in polarity, the pulses coincide with the negative peaks of the input for a positive modulating signal and the positive peaks of the input signal for a negative modulating signal, as shown in FIG. 2(b) and FIG. 2(c). The pulse generator may comprise any of a number of conventional circuits, e.g. a 90° phase-shift network in combination with a blocking oscillator.

The pulse output of pulse generator 12 periodically actuates switch 6, thereby momentarily connecting amplifier 5 and amplifier 8 in series, with feedback provided over line 54 through resistor 9. The serially connected amplifiers function as an inverter with the amplitude of the output signal determined by the input signal amplitude and the ratio of resistors 9 and 4. In that the pulses coincide with the peaks of the input signal, as previously described, the inverted output of amplifier 8 will assume a magnitude proportional to the instantaneous peak amplitude of the input signal. Capacitor 7 is charged to this instantaneous value. Thus, each time a pulse is generated by generator 12, capacitor 7 is charged to a value proportional to the peak amplitude of the input signal on line 50. Hence, without further circuitry, the output signal at terminal 20 would consist of an approximation of the data represented by the modulation envelope of the input signal, as shown by the dotted curve in FIG. 2(d).

In order to more accurately reproduce the data represented by the modulation envelope of the input signal, the detector of the invention provides a feedback circuit connected across the storage means. The signals of modulating frequency, available from the storage capacitor, are differentiated and inverted by the differentiating circuit comprising capacitor 15, amplifier 16, and resistor 18, filter 14 serving to block signals of carrier frequency. The inverted derivative output of the differentiating circuit, shown in FIG. 2(e), is indicative of the instantaneous rate of change of the signals stored on capacitor 7. This derivative is integrated by the circuit comprisng resistor 17, amplifier 8, and capacitor 7 during the period when switch 6 is opened. The charge on capacitor 7 is varied in accordance with the integrating function. Thus, the charge on capacitor 7 is varied in accordance with the integral of its own rate of change between samplings of the input signal. The output signal on terminal 20 is thus a more continuous function representing an accurate reconstitution or reproduction of the modulation envelope of the input signal, as shown by the solid line in FIG. 2(d).

The operation of the embodiment of the invention shown in FIG. 1 has been described for an input signal comprising an amplitude modulated carrier. The detector of the invention is also operative with an input signal carrier which is phase-modulated with respect to the reference signal. The signal stored in capacitor 7 would, in the case of the phase-modulated input signal, be proportional to the sine of the phase angle between the two signals. If the input signal carrier were both amplitude and phase-modulated, the resultant signal on capacitor 7 would be the product of the two modulating signals.

FIG. 3 illustrates a multi-channel telemetry system utilizing the detector of the invention to accurately reproduce modulation envelopes representing intelligence derived from a plurality of sources. Each of the channels incorporates the detector circuit of the invention as shown for channel 1. In order to simplify the drawing, the detectors of channels 2 to N are not shown in detail. The reference numerals utilized in the detector of channel 1 are identical with those used in FIG. 1 and the operation of the channel 1 detector will not be further described. The telemetry signal on line 70, which may be a pulse train modulated, for example, in duration or by frequency shift, includes synchronizing pulses. The telemetry signal is applied to signal processor 71 which converts the data pulses to a pulse amplitude modulated pulse train which is applied to line 50. The signal processor also derives the synchronizing pulses to provide a synchronizing signal on line 72 to decommutator 73. Decommutator 73 provides a sequence of pulses to lines 57, 77, 78, 79 and other lines shown dashed which are connected to the switches of the detectors, e.g., switch 6 of the detector in channel 1. Detailed descriptions of representative signal processor and decommutator circuits are presented in Kuehn et al., "PDM–PAM Conversion System," Proceedings of the National Symposium on Telemetering, 1957, article 8.5, and "A Versatile Automatic Data Separation System for Pulse Multiplex Telemetering Systems," IRE Transactions on Telemetering and Remote Control, February 1955.

In operation, the telemetry input signal contains a series of pulses representing intelligence from a plurality of source, i.e. repetitive samplings of various data. The sequential samplings of a given data source are to be applied to a given detector in order to derive an accurate reproduction of the original information from the sampled data signals. The signal processor 71 converts the sampled data signals to an amplitude modulated pulse train which is applied to the input of each channel. The synchronizing pulses contained in the telemetry input signal, which are derived by the signal processor 71, are applied to decommutator 73 to selectively control the energization of the switches of the respective detectors in the channels of the system to thereby synchronize the switches and apply the sampled data signals to the correct channel. Decommutator 73 corresponds to pulse generator 12 in FIG. 1. Thus, each detector provides an output representative of the original information in the respective channels.

Although the invention and its operation has been described with reference to a specific embodiment, the invention is not limited to this embodiment. Many modifications within the spirit and scope of the invention will be obvious to those skilled in the art. It is thus intended that the invention is not limited to the particular details shown and described which may be varied without departing from the spirit and scope of the invention and the appended claims.

What is claimed as new and desired to be secured by Letters Patent of the United States is:

1. A detector for detecting the modulation envelope of an amplitude-modulated carrier comprising:
    (a) a switching means,
    (b) means for applying the signal to be detected to said switching means,
    (c) means for generating control pulses having a frequency equal to the frequency of the amplitude modulated carrier bearing the signal to be detected,
    (d) means for applying the generated control pulses to said switching means to actuate said switching means for a prescribed period during each cycle of a signal to be detected,
    (e) a storage means,
    (f) means connecting said switching means to said storage means so that said input signal is applied to said storage means when said switching means is actuated,
    (g) means connected to said storage means for modifying the stored signal between periods of actuation of said switching means comprising:
        (1) a low-pass filter,
        (2) a differentiating means,
        (3) a resistor, (4) means for connecting said low-pass filter, said differentiating means and said resistor in series and across said storage means,
(5) an amplifier,
(6) means connecting said amplifier directly across said storage means, the combination of said storage means, said resistor, and said amplifier comprising an integrating means which integrates the differentiated signal from said differentiating means to modify the signal stored on said storage means so as to smooth the detected modulation envelope stored on said storage means between periods of actuation of said switching means, and
(h) an output terminal connected to said storage means.

2. A detector for detecting the modulation envelope of an amplitude-modulated pulse train comprising:
(a) storage means,
(b) means for applying the amplitude-modulated pulse train to said storage means,
(c) means for modifying the signal stored on said storage means during the period between pulses of the pulse train comprising:
(1) a low-pass filter,
(2) a differentiating means,
(3) a resistor,
(4) means for connecting said low-pass filter, said differentiating means, and said resistor in series and across said storage means,
(5) an amplifier,
(6) means connecting said amplifier directly across said storage means so that said storage means, said resistor, and said amplifier serve to integrate a differentiated output signal of said differentiating means, and
(d) an output terminal connected to said storage means.

3. The detector of claim 2 in which said storage means is a capacitor.

4. The detector of claim 2 in which said differentiating means comprises:
(1) a capacitor,
(2) a high gain inverting amplifier,
(3) a resistor,
(4) means connecting said resistor across said amplifier, and
(5) means connecting said capacitor to the input terminal of said amplifier.

5. The detector of claim 2 in which said amplifier is a high-gain inverting amplifier.

6. In a detector for detecting a modulation envelope of an amplitude-modulated carrier,
(a) a synchronous detector comprising:
(1) a first amplifier,
(2) a storage means,
(3) a switching means to control the application of the input signal to be detected to said storage means,
(4) means for serially connecting said first amplifier, said switching means, and said storage means,
(5) a feedback connection between said storage means and said first amplifier,
(6) a second amplifier,
(7) means connecting said second amplifier across said storage means,
(8) a pulse generator for generating switching pulses of the same frequency as that of the amplitude modulated carrier bearing the signal to be detected,
(9) means connecting said pulse generator to said switching means so as to control the actuation of said switching means for a prescribed period of the cycle,
(b) means for modifying the signal stored on said storage means comprising:
(1) a low-pass filter,
(2) a differentiating means,
(3) a resistor,
(4) means for connecting said low-pass filter, said differentiating means, and said resistor in series and across said storage means, said storage means, said second amplifier, and said resistor serving to integrate the differentiated signal output of said differentiating means so as to modify the signal stored on said storage means between the actuation periods of said switching means to derive the modulation envelope, and
(c) an output terminal connected to said storage means.

7. The detector of claim 6 in which said first amplifier is a low-gain in-phase amplifier.

References Cited in the file of this patent
UNITED STATES PATENTS
2,988,704     Walker et al.             June 13, 1961